US008175847B2

(12) United States Patent
Zhang et al.

(10) Patent No.: US 8,175,847 B2
(45) Date of Patent: May 8, 2012

(54) TAG RANKING

(75) Inventors: Hong-Jiang Zhang, Bellevue, WA (US); Dong Liu, Beijing (CN); Meng Wang, Beijing (CN); Linjun Yang, Beijing (CN); Xian-Sheng Hua, Beijing (CN)

(73) Assignee: Microsoft Corporation, Redmond, WA (US)

( * ) Notice: Subject to any disclaimer, the term of this patent is extended or adjusted under 35 U.S.C. 154(b) by 455 days.

(21) Appl. No.: 12/415,722

(22) Filed: Mar. 31, 2009

(65) Prior Publication Data

US 2010/0250190 A1 Sep. 30, 2010

(51) Int. Cl.
*G06F 17/18* (2006.01)

(52) U.S. Cl. ........... 702/181; 702/122; 706/12; 707/748

(58) Field of Classification Search .................. 702/127, 702/179, 181, 182, 186, 122; 706/12; 707/478, 707/479; 709/218–224
See application file for complete search history.

(56) References Cited

U.S. PATENT DOCUMENTS

| | | | | |
|---|---|---|---|---|
| 7,958,127 | B2 * | 6/2011 | Edmonds et al. | 707/748 |
| 2010/0228691 | A1 * | 9/2010 | Yang et al. | 706/12 |

OTHER PUBLICATIONS

Ames, et al., "Why We Tag: Motivations for Annotation in Mobile and Online Media", retrieved at <<http://www.stanford.edu/~morganya/research/chi2007-tagging.pdf>>, ACM, Apr. 28-May 3, 2007, San Jose, California, pp. 10.

Kennedy, et al., "To Search or To Label? Precdicting the Performance of Search-based Automatic Image Classifiers", retrieved at <<http://delivery.acm.org/10.1145/1180000/1178712/p249-kennedy.pdf?key1=1178712&key2=3727311321&coll=GUIDE&dl=GUIDE&CFID=16582039&CFTOKEN=58263035>>, Oct. 26-27, 2006, Santa Barbara, California, USA, pp. 249-258.

Lew, et al., "Content-based Multimedia Information Retrieval: State of the Art and Challenges", retrieved at <<http://www.liacs.nl/home/mlew/mir.survey16b.pdf>>, ACM Transactions on Multimedia Computing, Communications, and Applications, Feb. 2006, pp. 26.

Smeulders, et al., "Content based Image Retrieval at the End of the Early Years", retrieved at <<http://ieeexplore.ieee.org/Xplore/login.jsp?url=iel5/34/19391/00895972.pdf?arnumber=895972>>, IEEE Transactions on Pattern Analysis and Machine Intelligence, vol. 22, No. 12, Dec. 2000, pp. 1349-1380.

Li, et al., "Real-Time Computerized Annotation of Pictures", retrieved at <<http://infolab.stanford.edu/~wangz/project/ imsearch/ALIP/ACMMM06/li06.pdf>>, Oct. 23-27, 2006, Santa Barbara, California, USA., pp. 10.

Monay, et al., "On Image Auto-annotation with Latent Space Modeling", retrieved at <<http://www.idiap.ch/~gatica/publications/Monay_Gatica_ACM_MM_2003.pdf>>, Nov. 2-8, 2003, Berkeley, California, USA, pp. 4.

Sychay, et al., "Effective Image Annotation via Active Learning", retrieved at <<http://ieeexplore.ieee.org/stamp/stamp.jsp?arnumber=1035755&isnumber=22221>>, IEEE, 2002, pp. 209-212.

(Continued)

*Primary Examiner* — John H Le
(74) *Attorney, Agent, or Firm* — L. Alan Collins; Collins & Collins Intellectual, LLC

(57) ABSTRACT

Technologies for generating a boosted tag ranking for a media instance, the boosted tag ranking based on probabilistic relevance estimation computed by a probabilistic relevance estimator and tag correlation refining performed by a tag correlation refiner. Such boosted tag rankings may be used for search result ranking, tag recommendation, and group recommendation.

19 Claims, 3 Drawing Sheets

100
Probabilistic Relevance Estimator — 110
Tag Correlation Refiner — 120
130
140
Boosted Tag Ranking — 150

OTHER PUBLICATIONS

Shi, et al., “Enhancing Image Annotation by Integrating Concept Ontology and Text-based Bayesian Learning Model”, retrieved at <<http://delivery.acm.org/10.1145/1300000/1291307/p341-shi.pdf?key1=1291307&key2=0375311321&coll=GUIDE&dl=GUIDE&CFID=17130445&CFTOKEN=25254636>>, Sep. 23-28, 2007, Augsburg, Bavaria, Germany, pp. 341-344.

Sigurbjornsson, et al., “Flickr Tag Recommendation based on Collective Knowledge”, retrieved at <<http://www2008.org/papers/pdf/p327-sigurbjornssonA.pdf>>, ACM, Apr. 21-25, 2008, Beijing, China, pp. 327-336.

Li, et al., “Learning Tag Relevance by Neighbor Voting for Social Image Retrieval”, Oct. 30-31, 2008, Vancouver, British Columbia, Canada, pp. 8.

Yan, et al., “A Learning-based Hybrid Tagging and Browsing Approach for Efficient Manual Image Annotation”, retrieved at <<http://ieeexplore.ieee.org/stamp/stamp.jsp?arnumber=4587380&isnumber=4587335>>, IEEE, 2008, pp. 8.

Wu, et al., “Learning to Tag”, Apr. 20-24, 2009, Madrid, Spain, pp. 10.

Chen, et al., “SheepDog—Group and Tag Recommendation for Flickr Photos by Automatic Search-based Learning”, Oct. 26-31, 2008, Vancouver, British Columbia, Canada., pp. 737-740.

Hsu, et al., “Video Search Reranking through Random Walk over Document-Level Context Graph”, retrieved at <<http://www.ee.columbia.edu/~lyndon/pubs/acmmm2007-rerank.pdf>>, Sep. 23-28, 2007, Augsburg, Bavaria, Germany, pp. 10.

Jing, et al., “VisualRank: Applying PageRank to Large-Scale Image Search”, retrieved at <<http://www.cc.gatech.edu/~yjing/pami__camera__ready.pdf>>, IEEE Transactions on Pattern Analysis and Machine Intelligence, vol. 30, No. 11, Nov. 2008, pp. 1877-1890.

Pan, et al., “Gcap: Graph-based Automatic Image Captioning”, retrieved at <<http://www.informedia.cs.cmu.edu/documents/MDDE04GCap.pdf>>, Proceedings of the 4th International Workshop on Multimedia Data and Document Engineering (MDDE 04), in conjunction with Computer Vision Pattern Recognition Conference (CVPR’04), Washington, DC, Jul. 2, 2004. pp. 10.

Jarvelin, et al., “Cumulated Gain-Based Evaluation of IR Techniques”, retrieved at <<http://delivery.acm.org/10.1145/590000/582418/p422-jarvelin.pdf?key1=582418&key2=0585311321&coll=GUIDE&dl=GUIDE&CFID=17130563&CFTOKEN=51434570>>, ACM Transactions on Information Systems, vol. 20, No. 4, Oct. 2002, pp. 422-446.

Parzen, “On Estimation of a Probability Density Function and Mode”, The Annals of Mathematical Statistics, vol. 33, No. 3 (1962), 1065-1076.

R.L. Cilibrasi, P.M.B. Vitanyi, The Google Similarity Distance, IEEE Trans. Knowledge and Data Engineering, 19:3(2007), 370-383.

* cited by examiner

System Memory
309
Operating System
Application Programs
Other Program Modules
Program Data
RAM
BIOS
ROM
305
306
Network Adapter
313
314
System Bus
308
307
Processing Unit
312
I/O Interfaces
Storage Device
304
311
Display Adapter
Mass Storage
310
Operating System
Application Programs
Program Modules
Program Data
301
I/O Device
303
Display
302
Power Source
390
300

TAG RANKING

BACKGROUND

Social media sharing web sites and the like typically allow users to annotate media instances with tags, which may facilitate media search and organization. Recent years have witnessed an explosion of community-contributed media content available online (e.g., Flickr, Youtube, and Zooomr). Such social media repositories typically allow users to upload personal media and annotate such with descriptive keywords called tags. Given such tags, users can more conveniently organize and access shared media content. However, the tags associated with a media instance are generally in a random order and without any importance or relevance information, which limits the effectiveness of these tags in search and other operations.

SUMMARY

The following presents a simplified summary of the disclosure in order to provide a basic understanding to the reader. This summary is not an extensive overview of the disclosure and it may not identify key/critical elements of the invention or delineate the scope of the invention. Its sole purpose is to present some concepts disclosed herein in a simplified form as a prelude to the more detailed description that is presented later.

The present examples provide technologies for generating a boosted tag ranking for a media instance, the boosted tag ranking based on probabilistic relevance estimation and tag correlation refining. Such boosted tag rankings may be used for search result ranking, tag recommendation, and group recommendation.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples may be described and illustrated herein as being implemented in a computing environment, the environment described is provided as an example and not a limitation. As those skilled in the art will appreciate, the present examples may be suitable for application in a variety of different types of computing environment or the like.

The term "tag" as used herein typically refers to a keyword or the like assigned to a media instance or the like, the tag generally considered metadata, the tag intended to be descriptive of the media instance and intended to facilitate browsing or searching or the like. The terms "media" and "media instance" as used herein generally refer to a digital media such as an image, video, audio, or the like. The term "media repository" or the like typically refers to a collection of a plurality of media instances with each media instance having, or capable of having, metadata at least in the form of one or more tags. In general, users may include human beings, and/or computing systems or the like.

Figure 1:
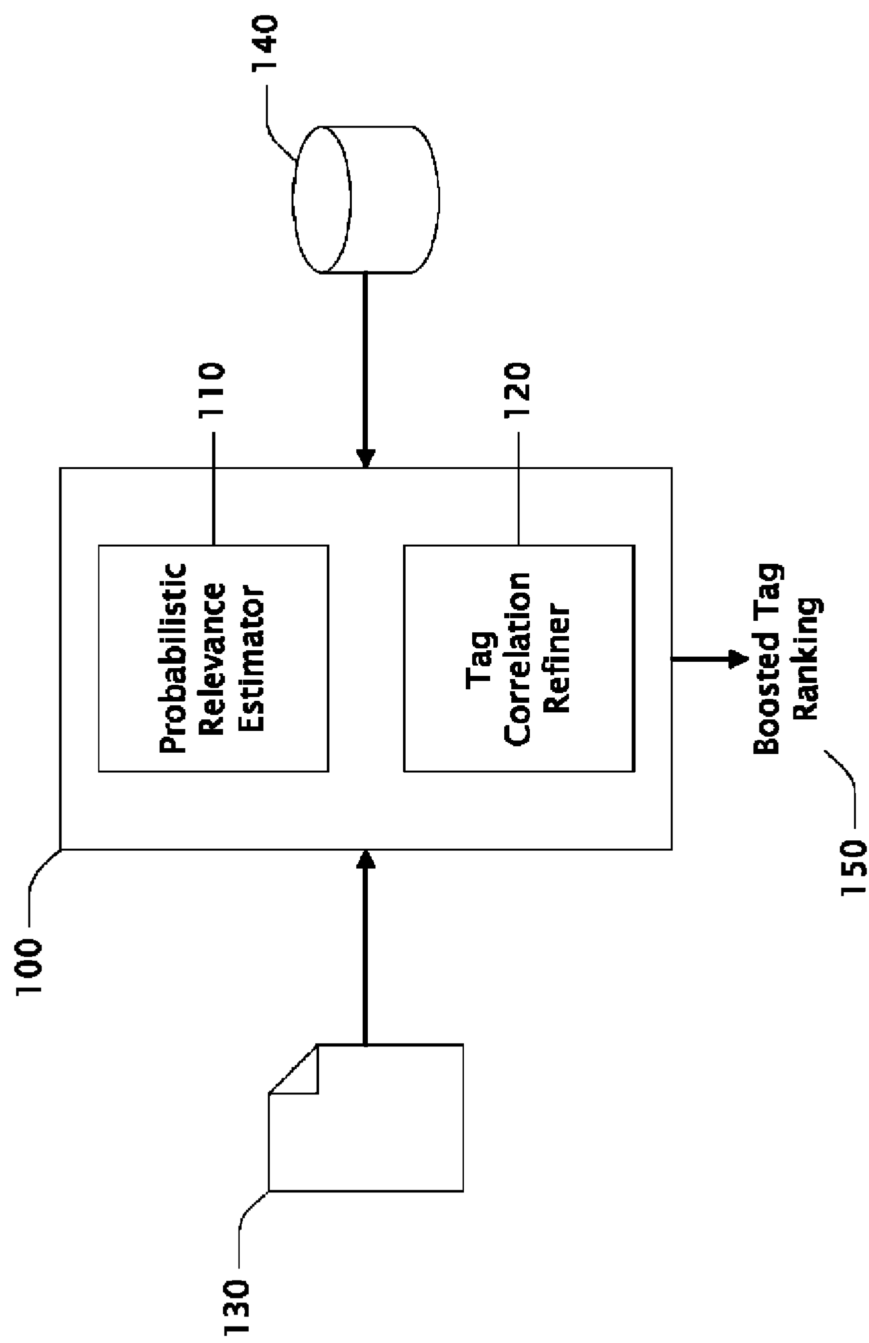
FIG. 1 is a block diagram showing an example tag ranking system suitable for automatically ranking tags of a target media instance according to their relevance to the media instance.

FIG. 1 is a block diagram showing an example tag ranking system ("TRS") 100 suitable for automatically ranking tags of a target media instance according to their relevance to the media instance. TRS 100 may be implemented in a computing environment such as that described in connection with FIG. 3 or the like. In one example, TRS 100 includes probabilistic relevance estimator ("PRE") 110 and tag correlation refiner ("TCR") 120, the functionality of both described in detail hereinafter. In this example, TRS 100 takes as input example media instance 130 including a plurality of tags and accesses example media repository 140 which includes a plurality, typically a large number (e.g., at least tens of thousands), of media instances each typically including one or more tags. Media instance 130 may come from media repository 130 or from elsewhere. After processing, TRS 100 generally provides a boosted tag ranking corresponding to the target media instance, such as boosted tag ranking 150 corresponding to media instance 130. In one example, media repository 140 may be a social media website or the like, a media store or the like, a collection of digital media, or any other site, store, or collection of media, or combination thereof, accessible to TRS 100. Some non-limiting web-based examples of such media repositories include Google, Flickr, Youtube, and Zooomr.

TRS 100 typically provides boosted tag ranking 150 suitable at least for search result ranking, tag recommendation, and group recommendation. Search result ranking is typically to provide a relevance ranking for each media instance result of a search, the relevance ranking relative to the search term. Tag recommendation is typically to recommend a set of tags for a media instance, such as media instance 130, based on the content of a media repository, such as media repository 140. Tag recommendation thus allows a user to select relevant tags from the recommended set of tags, which tend to be highly relevant. Such tag recommendation may be fully automatic. Group recommendation is related to groups, which are collections of media instances with a certain common theme or the like. Such collections may be part of a media repository, such as media repository 140. Group recommendation typically enables the selection of an appropriate group(s) for a particular media instance, such as media instance 130, based on the top tags in a ranking, such as ranking 150, used to search for related groups. Such group recommendation may be fully automatic, thus not requiring that a media instance include an initial tag.

Figure 2:
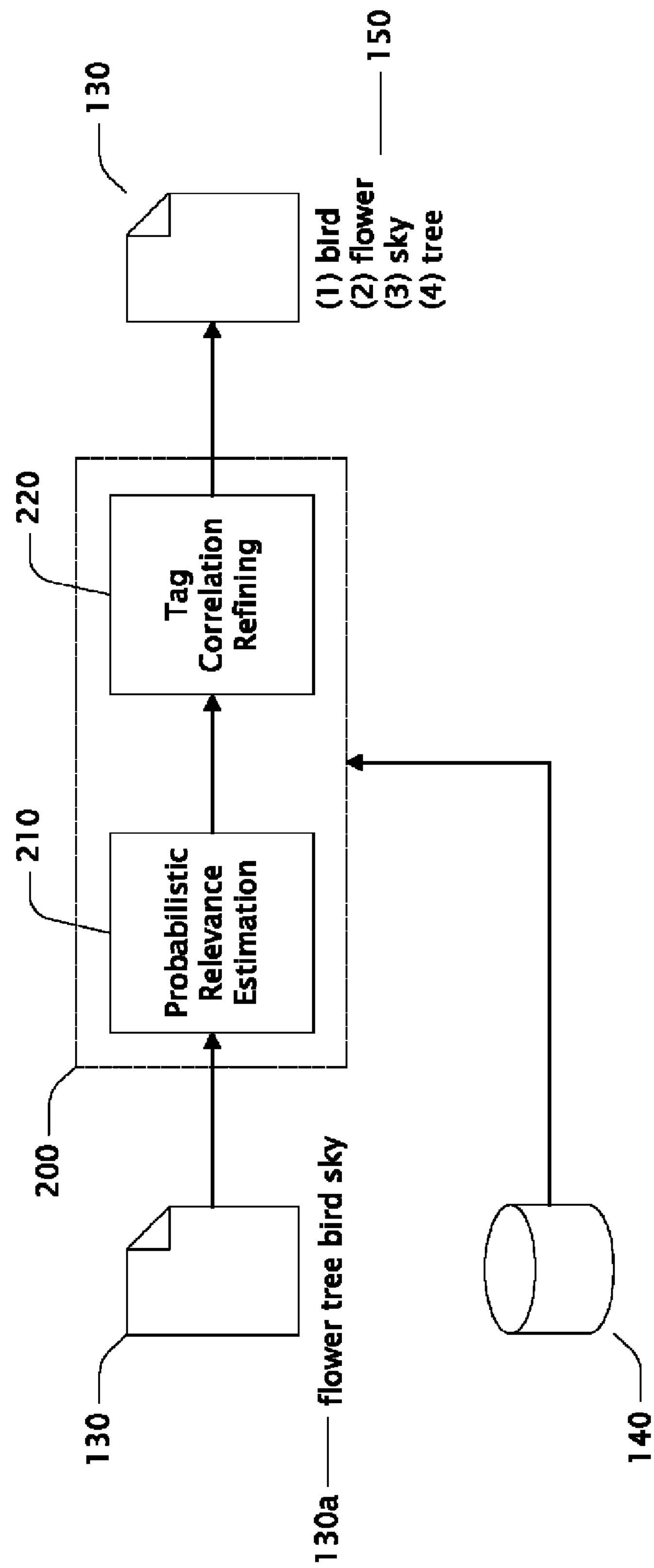
FIG. 2 is a block diagram showing an example method for generating a boosted tag ranking for a media instance.

FIG. 2 is a block diagram showing an example method 200 for generating a boosted tag ranking for a media instance, such as boosted tag ranking 150 of tags 120*a* of media instance 130. In one example, method 200 may be performed by a TRS system, such as TRS system 100 of FIG. 1. Inputs to method 200 typically include a target media instance 130 including a plurality of corresponding tags 130*a*, as well as a plurality of tagged media from example media repository 140 or the like. Method 200 typically includes a probabilistic relevance estimation step 210 and a tag correlation refining step 220.

Block 210 typically indicates the probabilistic relevance estimation step of method 200—the estimation of a relevance score for each input tag, such as tags 130*a*, using a probabilistic approach. Such relevance estimations may be computed by a probabilistic relevance estimator, such as PRE 110 described in connection with FIG. 1. The inputs to block 210 typically include the target media instance 130 including a plurality of corresponding tags 130*a*, as well as a plurality of tagged media from example media repository 140. The result of such relevance estimations is generally relevance tag ranking. In one example, given a tag t (e.g., of tags 130*a*) of media instance x (e.g., 130), its relevance score is defined as:

$$s(t,x)=p(t|x)/p(t) \tag{1}$$

where s(t,x) is the relevance score of tag t of media instance x, and where p(t|x) indicates the probability of tag t given media instance x. However, tag t may not be meaningfully descriptive of media instance x if tag t appears too frequently in the dataset X (e.g., repository 140). For example, given the tag “image” for an image x in a set of all images, the probability p(t|x) will always be 1, which is not very meaningful or informative even though it may be descriptive of image x (that is, image x is an “image”). Therefore, p(t|x) is normalized by p(t), the prior probability of tag t, to penalize for frequently appearing tags.

Further, based on Bayes' rule, it can be derived that:

$$s(t,x)=\frac{p(x|t)p(t)}{p(x)p(t)}=\frac{p(x|t)}{p(x)} \tag{2}$$

where p(x) and p(x|t) are the prior probability density function and the probability density function of media instances in X conditioned on tag t, respectively. Because the objective is to rank the tags of media instance x and because p(x) is identical for each tag, Equation (2) can be simplified as:

$$s(t,x)=p(x|t) \tag{3}$$

The classical Kernel Density Estimation (“KDE”) method can then be used to estimate the probability density function p(x|t). Given $X_i$, which is the set of media instances from X that include tag $t_i$, the KDE method measures $p(x|t_i)$ as:

$$s(t_i,x)=p(x|t_i)=\frac{1}{|X_i|}\sum_{x_k\in X_i}K_\sigma(x-x_k) \tag{4}$$

where $|X_i|$ is the cardinality of $X_i$ and $K_\sigma$ is the Gaussian kernel function with a radius parameter σ, i.e., $$K_\sigma(x-x_k)=\exp\left(-\frac{\|x-x_k\|^2}{\sigma^2}\right). \tag{5}$$

The media instances of $X_i$ that have the smallest Euclidean distance to x are generally considered “neighbors” of x. In one example, the N nearest neighbors of x are the N media instances of $X_i$ that have the smallest Euclidean distance to x. The relevance scores computed by Equation (4) indicate the relevance of each tag $t_i$ (e.g., tags 130*a*) of media instance x (e.g., 130). In one example, the radius parameter σ in Equation (5) is set to the median value of all pair-wise Euclidian distances between the images of $X_i$. The tags are ranked based on the computed relevance scores with those with larger relevance scores typically being ranked higher, where higher-ranked tags are generally considered more relevant. Such ranked relevance scores typically comprise the output tag ranking of block 210, with each relevance score or ranking typically being a value between 0 and 1.

Block 220 typically indicates the tag correlation refining step of method 200—the refining of relevance scores by performing a random walk over a tag graph. Such tag correlation refining may be performed by a tag correlation refiner, such as TCR 120 described in connection with FIG. 1. The inputs to block 220 typically include the target media instance 130 including a relevance tag ranking typically based on probabilistic relevance estimation, as well as a plurality of tagged media from example media repository 140.

Probabilistic relevance estimation, which tends to take a media instance's neighbors into account, tends to not account for the relationship between tags. To consider such relationships, a random walk over a tag graph for each neighbor media instance may be performed. The results of such a random walk typically includes promoting tags of a relevance tag ranking that have many near neighbors while demoting isolated tags. The nodes of such a tag graph are typically the tags of a media instance and the edges are typically weighted with pair-wise tag similarity. In one example, two forms of tag similarity measurements, i.e., tag exemplar similarity and tag concurrence similarity, are combined to form the pair-wise similarity used in tag graph construction.

A tag graph typically models the relationship among a set of tags associated with a media instance, where each node of the graph represents a tag and each edge of the graph denotes the correlation between a corresponding pair of tags. A tag graph is typically constructed based on a tag t associated with a media instance x, and a collection $\Gamma_t$ of the N nearest neighbors of media instance x, which are considered exemplar media instances of tag t with respect to media instance x, where $\Gamma_t \subseteq X_i \subseteq X$. Tag exemplar similarity is typically based on comparisons of the various media instances in collection $\Gamma_t$. In the case of image or video media instances, these comparisons may be comparisons of visual aspects of the media instances. In the case of audio or other media instances, these comparisons may be comparisons of audio or other aspects respectively of the media instances. In one example, the exemplar similarity between tags $t_i$ and $t_j$ is defined as:

$$\varphi_e(t_i,t_j)=\exp\left(-\frac{1}{N*N}\sum_{x\in\Gamma_{t_i},y\in\Gamma_{t_j}}\frac{\|x-y\|^2}{\sigma^2}\right) \tag{6}$$

where the value of the radius parameter σ is generally the same as that used in Equation (5).

Tag concurrence similarity is typically based on tag co-occurrence. In one example, tag concurrence similarity is computed by first estimating the distance between two tags $t_i$ and $t_j$:

$$d(t_i, t_j) = \frac{\max(\log f(t_i), \log f(t_j)) - \log f(t_i, t_j)}{\log G - \min(\log f(t_i), \log f(t_j))} \quad (7)$$

where $f(t_i)$ and $f(t_j)$ are the number of media instances tagged with tag $t_i$ and tag $t_j$ respectively and $f(t_i,t_j)$ is the number of media instances tagged with both tag $t_i$ and tag $t_j$. These numbers may be obtained by performing a search by tag on a data set X using the tags $t_i$, $t_j$, and $(t_i, t_j)$ as search terms respectively. In one example, dataset X may be any large-scale tagged media repository or online media collection such as Flickr or Youtube or the like. The concurrence similarity between tags $t_i$ and $t_j$ is then defined as:

$$\phi_c(t_i,t_j)=\exp(-d(t_i,t_j)) \quad (8)$$

Tag exemplar similarity and tag concurrence similarity tend to be complimentary. These similarities may be combined as:

$$s_{ij}=s(t_i,t_j)=\lambda\cdot\phi_e(t_i,t_j)+(1-\lambda)\cdot\phi_c(t_i,t_j) \quad (9)$$

where $\lambda$ belongs to [0, 1]. The pair-wise tag similarity or combined similarity value $s_{ij}$ is typically used as the weight of the edge between tags $t_i$ and $t_j$ in the tag graph.

Tag correlation refining is generally performed by a random walk over the tag graph in order to boost the performance of the tag ranking described in connection with block 210. In one example, given a tag graph with n nodes, the term $r_k(i)$ denotes the relevance score of node i at iteration k. The relevance scores of all the nodes in the tag graph at iteration k form a column vector $r_k \equiv [r_k(i)]_{n\times 1}$. Let P denote an n-by-n transition matrix; its element $p_{ij}$ typically indicates the probability of the transition from node i to node j and is computed as:

$$p_{ij} = \frac{s_{ij}}{\sum_k s_{ik}} \quad (10)$$

where $s_{ij}$ is the pair-wise tag similarity between node i and node j computed using Equation (9). In this example, the random walk process is then formulated as:

$$r_k(j) = \alpha \sum_i r_{k-1}(i) p_{ij} + (1-\alpha) v_j \quad (11)$$

where $v_j$ is the initial probabilistic relevance score of tag $t_j$; and where $\alpha$ is a weight parameter that belongs to [0, 1] The result of the random walk process is generally to promote tags of a relevance tag ranking that have many near neighbors and demote isolated tags.

Consider Equation (11) re-written in matrix form:

$$r_k=\alpha P r_{k-1}+(1-\alpha)v \quad (12)$$

thus providing:

$$r_\pi = \lim_{n\to\infty} (\alpha P)^n r_0 + (1-\alpha)\left(\sum_{i=1}^{n} (\alpha P)^{i-1}\right) v. \quad (13)$$

Based on Equation (13), it can be shown that the iteration of Equation (11) converges to a fixed point $r_\pi$ where the unique solution is:

$$r_\pi=(1-\alpha)(I-\alpha P)^{-1}v$$

where I denotes an identity matrix.

In one example based on experimental results, the optimal values of $\lambda$ in Equation (9) and $\alpha$ in Equation (11) are around 0.8 and 0.5 respectively. The output of block 220 is typically a boosted tag ranking, such as boosted tag ranking 150 of media instance 130.

Relevance tag ranking and boosting as described in connection with blocks 210 and 220 respectively may be used for search result ranking, tag recommendation, and group recommendation. Considering search result ranking, conventional media searches tend to find media instances with tags matching those provided as search terms, but may not provide a meaningful ranking of the search results. In an example of search result ranking, the query tag (the search term) is used to generate a relative ranking for each media instance in the search results based on a position of the query tag in each media instance's boosted tag ranking. In general, the higher the query tag is ranked in a media instance's boosted tag ranking, the more relevant the media instance is considered in the search results.

Considering tag recommendation, conventional tag recommendation approaches may be categorized into automatic (i.e., automatic tagging) and semi-automatic approaches. In one example, boosted tag ranking can be used for automatic tag recommendation where a user is not required to provide initial tags for a target media instance. In this example, the K nearest neighbor media instances of the target media instance are identified in a repository. In one example, the neighbors of an image are identified based on visual content information. Then the top m tags (per the boosted tag ranking) of each neighboring media instance are collected. As a result, m×K tags are collected in total. Of these, the unique tags in the collection are recommended to the user, sorted according to their occurrence frequency in the collection.

Considering group recommendation, users can add media instances to groups such that they can be more easily accessed. However, the large number of groups in media repositories can make it difficult to find a suitable group. Even so, boosted tag rankings can be used to make suitable group recommendations. In one example, because groups are generally titled and described using words corresponding to their media content, the top tags of a target media instance (the media instance to added to a group) are used as search terms in a search for a potentially suitable group. Since the top tags in the media instance's boosted tag ranking are the keywords that may best describe the media content, there is a high probability that a suitable group for the target media instance will be found.

In yet another example, a media instance may be included as part of a document (such as an electronic document) along with text descriptive of the media instance, text such as one or more labels, captions, titles, and/or other descriptive text. Such descriptive text is typically located in the document near or around the media instance. Document text that is typically located near or around the media instance that may be descriptive of the media instance is generally termed herein "surrounding text". Words from such surrounding text may be considered tags in boosted tag ranking.

Figure 3:
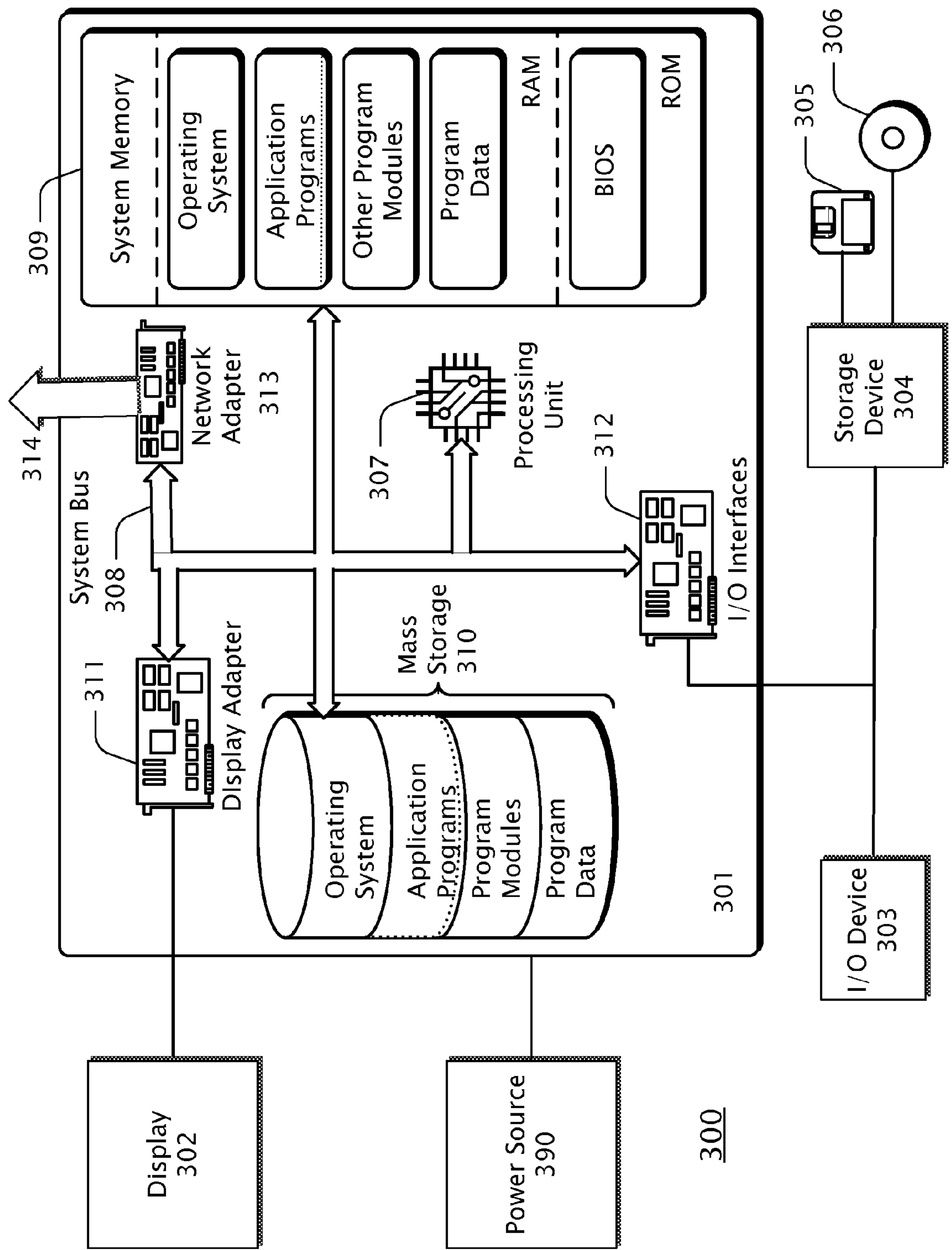
FIG. 3 is a block diagram showing an example computing environment in which the technologies described herein may be implemented.

FIG. 3 is a block diagram showing an example computing environment 300 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 300 typically includes a general-purpose computing system in the form of a computing device 301 coupled to various components, such as peripheral devices 302, 303, 304 and the like. System 300 may couple to various other components, such as input devices 303, including voice recognition, touch pads, buttons, keyboards and/or pointing devices, such as a mouse or trackball, via one or more input/output ("I/O") interfaces 312. The components of computing device 301 may include one or more processors (including central processing units ("CPU"), graphics processing units ("GPU"), microprocessors ("μP"), and the like) 307, system memory 309, and a system bus 308 that typically couples the various components. Processor 307 typically processes or executes various computer-executable instructions to control the operation of computing device 301 and to communicate with other electronic and/or computing devices, systems or environment (not shown) via various communications connections such as a network connection 314 or the like. System bus 308 represents any number of several types of bus structures, including a memory bus or memory controller, a peripheral bus, a serial bus, an accelerated graphics port, a processor or local bus using any of a variety of bus architectures, and the like.

System memory 309 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 309 typically stores data, computer-executable instructions and/or program modules comprising computer-executable instructions that are immediately accessible to and/or presently operated on by one or more of the processors 307.

Mass storage devices 304 and 310 may be coupled to computing device 301 or incorporated into computing device 301 via coupling to the system bus. Such mass storage devices 304 and 310 may include non-volatile RAM, a magnetic disk drive which reads from and/or writes to a removable, non-volatile magnetic disk (e.g., a "floppy disk") 305, and/or an optical disk drive that reads from and/or writes to a non-volatile optical disk such as a CD ROM, DVD ROM 306. Alternatively, a mass storage device, such as hard disk 310, may include non-removable storage medium. Other mass storage devices may include memory cards, memory sticks, tape storage devices, and the like.

Any number of computer programs, files, data structures, and the like may be stored in mass storage 310, other storage devices 304, 305, 306 and system memory 309 (typically limited by available space) including, by way of example and not limitation, operating systems, application programs, data files, directory structures, computer-executable instructions, and the like.

Output components or devices, such as display device 302, may be coupled to computing device 301, typically via an interface such as a display adapter 311. Output device 302 may be a liquid crystal display ("LCD"). Other example output devices may include printers, audio outputs, voice outputs, cathode ray tube ("CRT") displays, tactile devices or other sensory output mechanisms, or the like. Output devices may enable computing device 301 to interact with human operators or other machines, systems, computing environments, or the like. A user may interface with computing environment 300 via any number of different I/O devices 303 such as a touch pad, buttons, keyboard, mouse, joystick, game pad, data port, and the like. These and other I/O devices may be coupled to processor 307 via I/O interfaces 312 which may be coupled to system bus 308, and/or may be coupled by other interfaces and bus structures, such as a parallel port, game port, universal serial bus ("USB"), fire wire, infrared ("IR") port, and the like.

Computing device 301 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 301 may be coupled to a network via network adapter 313 or the like, or, alternatively, via a modem, digital subscriber line ("DSL") link, integrated services digital network ("ISDN") link, Internet link, wireless link, or the like.

Communications connection 314, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 390, such as a battery or a power supply, typically provides power for portions or all of computing environment 300. In the case of the computing environment 300 being a mobile device or portable device or the like, power source 390 may be a battery. Alternatively, in the case computing environment 300 is a desktop computer or server or the like, power source 390 may be a power supply designed to connect to an alternating current ("AC") source, such as via a wall outlet.

Some mobile devices may not include many of the components described in connection with FIG. 3. For example, an electronic badge may be comprised of a coil of wire along with a simple processing unit 307 or the like, the coil configured to act as power source 390 when in proximity to a card reader device or the like. Such a coil may also be configure to act as an antenna coupled to the processing unit 307 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 302, I/O device 303, or many of the other components described in connection with FIG. 3. Other mobile devices that may not include many of the components described in connection with FIG. 3, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions.

Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A system for generating a boosted tag ranking for a media instance, the system comprising:

a probabilistic relevance estimator operable to estimate a relevance score for each input tag of the target media instance, wherein each relevance score is associated with a corresponding input tag, wherein the relevance scores are ordered by relevance thus forming a relevance tag ranking; and a tag correlation refiner operable to refine the relevance tag ranking based on tag similarity measurements derived from media instances that share a common tag with the media instance wherein the tag similarity measurements are based on tag exemplar similarity and tag concurrence similarity, wherein the media instances are comprised by at least One media repository, and wherein the tag exemplar similarity between tags $t_i$ and $t_j$ is defined as:

$$\varphi_e(t_i, t_j) = \exp\left(-\frac{1}{N*N}\sum_{x\in\Gamma_{t_i}, y\in\Gamma_{t_j}}\frac{\|x-y\|^2}{\sigma^2}\right)$$

where $\Gamma_t$ represents a collection of N nearest media instances of the media instances and where σ is a radius parameter.

2. The system of claim 1 wherein the radius parameter σis the median value of all pair-wise Euclidian distances between the media instances.

3. The system of claim 1 wherein the tag concurrence similarity between tags $t_i$ and $t_j$ is computed in part by estimating the distance between the tags $t_i$ and $t_j$:

$$d(t_i, t_j) = \frac{\max(\log f(t_i), \log f(t_j)) - \log f(t_i, t_j)}{\log G - \min(\log f(t_i), \log f(t_j))}$$

where $f(t_i)$ and $f(t_j)$ are total numbers of media instances tagged with tag $t_i$ and tag $t_j$ respectively in a media repository , and $f(t_i,t_j)$ is a total number of media instances tagged with both tag $t_i$ and tag $t_j$ in the media repository.

4. The system of claim 3 wherein the concurrence similarity between tags $t_i$ and $t_j$ is defined as:

$$\phi_c(t_i,t_j)=\exp(-d(t_i,t_j)).$$

5. The system of claim 4 wherein the tag exemplar similarity and tag concurrence similarity between two tags $t_i$ and $t_j$ are combined as similarity value $s_{ij}$.

6. The system of claim 5 wherein the similarity value $s_{ij}$ is defined as:

$$s_{ij}=s(t_i,t_j)=\lambda\cdot\phi_e(t_i,t_j)+(1-\lambda)\cdot\phi_c(t_i,t_j)$$

where λ belongs to [0, 1].

7. The system of claim 6 wherein the tag correlation refiner constructs a tag graph wherein an edge between two nodes of the tag graph, wherein the two nodes represent the two tags $t_i$ and $t_j$, is weighted based on the similarity value $s_{ij}$.

8. The system of claim 7 wherein a random walk over the tag graph is performed, the random walk operable to promote tags of the relevance tag ranking that have many near neighbors and demote isolated tags of the relevance tag ranking.

9. The system of claim 1 wherein the media instance is a digital image.

10. The system of claim 1 wherein the media instance is a digital video.

11. The system of claim 1 wherein the each input tag is taken from surrounding text of a document including the media instance.

12. The system of claim 1 wherein a search result ranking is generated for each media instance returned in a search.

13. The system of claim 1 wherein a group recommendation is generated for the media instance based in part on keywords associated with various groups.

14. The system of claim 1 wherein a tag recommendation is generated for the media instance and wherein the each input tag is derived from neighbors of the media instance.

15. A method for generating a boosted tag ranking for a media instance, the method comprising:

estimating, by a probabilistic relevance estimator of a computer, a relevance score for each input tag of the target media instance, wherein each relevance score is associated with a corresponding input tag, wherein the relevance scores are ordered by relevance thus forming a relevance tag ranking; and refining, by a tag correlation refiner of the computer, the relevance tag ranking based on tag similarity measurements derived from media instances that share a common tag with the media instance wherein the tag similarity measurements are based on tag exemplar similarity and tag concurrence similarity, wherein the media instances are comprised by at least one media repository, and wherein the tag exemplar similarity between tags $t_i$ and $t_j$ is defined as:

$$\varphi_e(t_i, t_j) = \exp\left(-\frac{1}{N*N}\sum_{x\in\Gamma_{t_i}, y\in\Gamma_{t_j}}\frac{\|x-y\|^2}{\sigma^2}\right)$$

where $\Gamma_t$ represents a collection of N nearest media instances of the media instances, and where σ is a radius parameter.

16. The method of claim 15 wherein a search result ranking is generated for each media instance returned in a search.

17. The method of claim 15 wherein a group recommendation is generated for the media instance based in part on keywords associated with various groups.

18. The method of claim 15 wherein a tag recommendation is generated for the media instance and wherein the each input tag is derived from neighbors of the media instance.

19. One or more computer-readable media embodying computer-executable instructions that, when executed by a processor of a computer, cause the computer to perform a method for generating a boosted tag ranking for a media instance, the method comprising:

estimating, by a probabilistic relevance estimator of the computer, a relevance score for each input tag of the target media instance, wherein each relevance score is associated with a corresponding input tag, wherein the relevance scores are ordered by relevance thus forming a relevance tag ranking; and refining, by a tag correlation refiner of the computer, the relevance tag ranking based on tag similarity measurements derived from media instances that share a common tag with the media instance wherein the tag similarity measurements are based on tag exemplar similarity and tag concurrence similarity, wherein the media instances are comprised by at least one media repository, and wherein the tag exemplar similarity between tags $t_i$ and $t_j$ is defined as:

$$\varphi_e(t_i, t_j) = \exp\left(-\frac{1}{N*N}\sum_{x\in\Gamma_{t_i}, y\in\Gamma_{t_j}}\frac{\|x-y\|^2}{\sigma^2}\right)$$

where $\Gamma_t$ represents a collection of N nearest media instances of the media instances, and where σ is a radius parameter.

* * * * *